(12) United States Patent
Sagall et al.

(10) Patent No.: US 8,780,120 B2
(45) Date of Patent: Jul. 15, 2014

(54) GPU SELF THROTTLING

(75) Inventors: Nicholas P. Sagall, Seattle, WA (US); Christopher J. Tector, Sammamish, WA (US); Orest B. Zborowski, North Wales, PA (US)

(73) Assignee: Microsoft Corporation, Redmond, WA (US)

(*) Notice: Subject to any disclaimer, the term of this patent is extended or adjusted under 35 U.S.C. 154(b) by 246 days.

(21) Appl. No.: 13/276,593

(22) Filed: Oct. 19, 2011

(65) Prior Publication Data

US 2013/0083042 A1 Apr. 4, 2013

Related U.S. Application Data

(60) Provisional application No. 61/542,213, filed on Oct. 2, 2011.

(51) Int. Cl.
*G06F 15/16* (2006.01)
*G06T 1/00* (2006.01)

(52) U.S. Cl.
USPC ............... 345/501; 712/32; 712/34; 718/102

(58) Field of Classification Search
USPC ........................................................ 718/102
See application file for complete search history.

(56) References Cited

U.S. PATENT DOCUMENTS

| | | | |
|---|---|---|---|
| 7,095,416 B1 | 8/2006 | Johns et al. | |
| 7,315,308 B2 | 1/2008 | Wilt et al. | |
| 7,388,581 B1 * | 6/2008 | Diard et al. | 345/421 |
| 7,533,371 B1 * | 5/2009 | Johns et al. | 717/130 |
| 8,310,492 B2 * | 11/2012 | McCrary et al. | 345/522 |
| 2007/0006060 A1 | 1/2007 | Walker | |
| 2007/0139421 A1 * | 6/2007 | Chen et al. | 345/501 |
| 2009/0113251 A1 | 4/2009 | Goossen et al. | |
| 2009/0309885 A1 * | 12/2009 | Samson et al. | 345/519 |
| 2011/0084972 A1 | 4/2011 | Duluk, Jr. et al. | |
| 2011/0109624 A1 * | 5/2011 | Greenberg et al. | 345/419 |
| 2012/0260081 A1 * | 10/2012 | de Cesare et al. | 713/100 |

OTHER PUBLICATIONS

[Online], [retrieved Aug. 2, 2013], Mistry, et al "Events Timing and Profiling", http://www.ece.neu.edu/groups/nucar/GPU/OpenCL_Course/lec11_timing.pptx, Jun. 23, 2011.*
Stuart, et al., "GPU-to-CPU Callbacks", Retrieved at <<http://www.idav.ucdavis.edu/func/return_pdf?pub_id=1039>>, Proceedings of the Third Workshop on UnConventional High Performance Computing, UCHPC(Euro-Par Workshops), Aug. 30-Sep. 3, 2010, pp. 8.
Elliott, et al., "Real-Time Multiprocessor Systems with GPUs", Retrieved at <<http://citeseerx.ist.psu.edu/viewdoc/download?doi=10.1.1.167.4892&rep=rep1&type=pdf, Retrieved Date: Oct. 5, 2011, pp. 1-16.

* cited by examiner

*Primary Examiner* — Ulka Chauhan
*Assistant Examiner* — Patrick F Valdez
(74) *Attorney, Agent, or Firm* — Micah Goldsmith; Glen Johnson; Micky Minhas

(57) ABSTRACT

Techniques for GPU self throttling are described. In one or more embodiments, timing information for GPU frame processing is obtained using a timeline for the GPU. This may occur by inserting callbacks into the GPU processing timeline. An elapsed time for unpredictable work that is inserted into the GPU workload is determined based on the obtained timing information. A decision is then made regarding whether to "throttle" designated optional/non-critical portions of the work for a frame based on the amount of elapsed time. In one approach the elapsed time is compared to a configurable timing threshold. If the elapsed time exceeds the threshold, work is throttled by performing light or no processing for one or more optional portions of a frame. If the elapsed time is less than the threshold, heavy processing (e.g., "normal" work) is performed for the frame.

20 Claims, 4 Drawing Sheets

US 8,780,120 B2

GPU SELF THROTTLING

RELATED APPLICATIONS

This application claims the benefit under 35 U.S.C. §119(e) of a related U.S. Provisional Application Ser. No. 61/542,213 filed Oct. 2, 2011 titled "GPU Self Throttling" to Sagall et al., the disclosure of which is incorporated by reference herein in its entirety.

BACKGROUND

When rendering graphics/frames for a real-time application, such as a video game, it is often hard to predict how long a particular part of the frame will take. If it is determined ahead of time that a frame is going to take a relatively long time to render (e.g., based on some timing threshold), steps may be taken to lower the burden on the GPU (graphics processing unit) by not rendering some non-critical parts of the frame. One traditional solution relies upon the CPU (central processing unit) timeline to time the rendering and take corrective action based on the timing. However, using the CPU timeline may be problematic because by the time that the CPU knows a timing issue exists, the work for the next frame may have already been submitted to the GPU and it may be very difficult or impossible to fix a preceding frame. Generally, traditional systems address this by always assuming a worst case scenario for frame processing, which results in under-utilization of the GPU much of the time.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques for GPU self throttling are described. In one or more embodiments, timing information for GPU frame processing is obtained using a timeline for the GPU. This may occur by inserting callbacks into the GPU processing timeline. An elapsed time for unpredictable work that is inserted into the GPU workload is determined based on the obtained timing information. A decision is then made regarding whether to "throttle" designated optional/non-critical portions of the work for a frame based on the amount of elapsed time. In one approach the elapsed time is compared to a configurable timing threshold. If the elapsed time exceeds the threshold, work is throttled by performing light or no processing for one or more optional portions of a frame. If the elapsed time is less than the threshold, heavy processing (e.g., "normal" work) is performed for the frame.

DETAILED DESCRIPTION

Overview

Techniques for GPU self throttling are described. In one or more embodiments, timing information for GPU frame processing is obtained using a timeline for the GPU. This may occur by inserting callbacks into the GPU processing timeline. An elapsed time for unpredictable work that is inserted into the GPU workload is determined based on the obtained timing information. A decision is then made regarding whether to "throttle" designated optional/non-critical portions of the work for a frame based on the amount of elapsed time. In one approach the elapsed time is compared to a configurable timing threshold. If the elapsed time exceeds the threshold, work is throttled by performing light or no processing for one or more optional portions of a frame. If the elapsed time is less than the threshold, heavy processing (e.g., "normal" work) is performed for the frame.

In the discussion that follows, a section titled "Operating Environment" is provided and describes one environment in which one or more embodiments can be employed. Following this, a section titled "GPU Self Throttling Techniques" describes example techniques in accordance with one or more embodiments. Last, a section titled "Example System" describes example computing systems and devices that can be utilized to implement one or more embodiments.

Operating Environment

Figure 1:
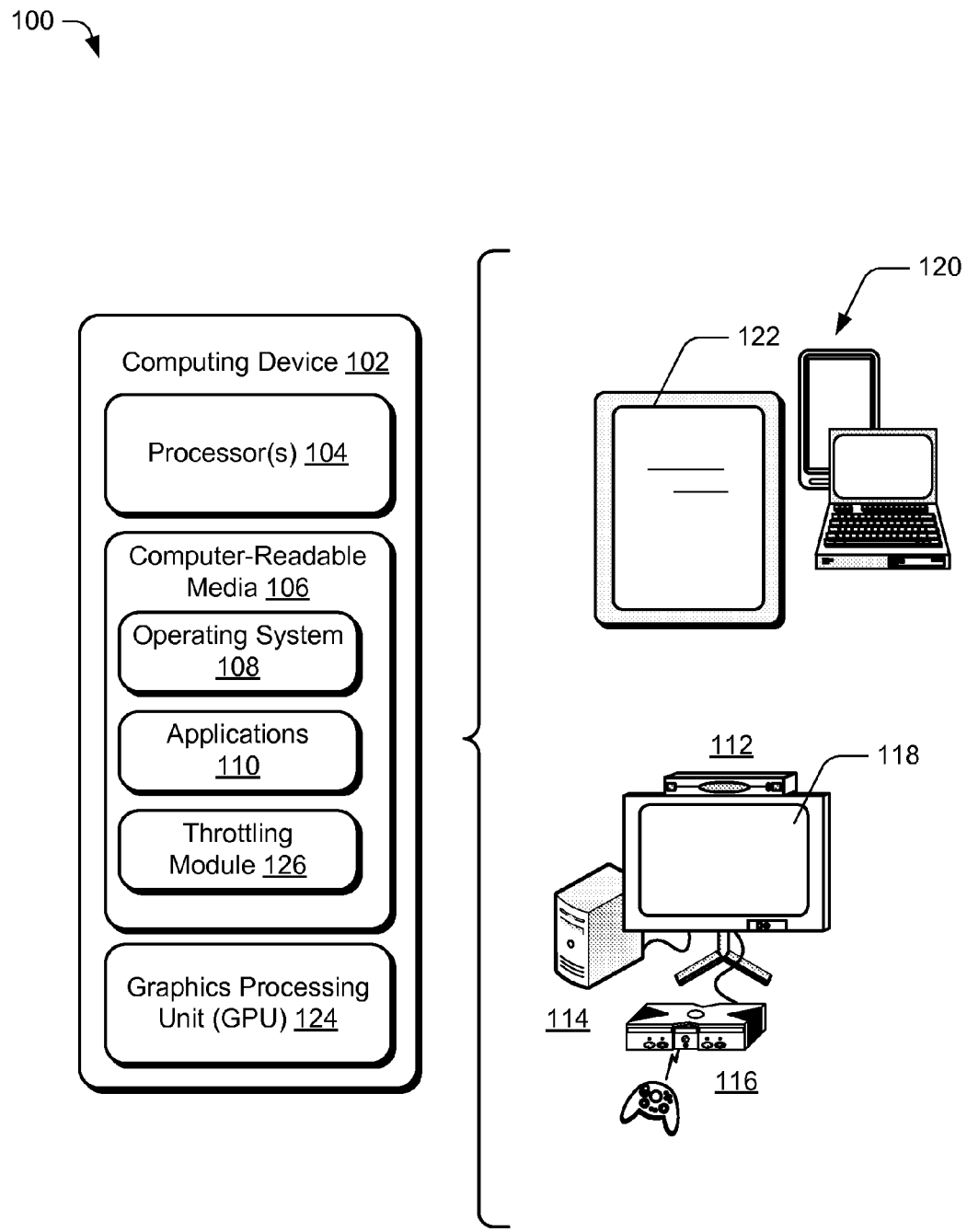
FIG. 1 illustrates an example operating environment in which one or more embodiments of GPU self throttling can be employed.

FIG. 1 illustrates an operating environment in accordance with one or more embodiments, generally at 100. The environment 100 includes a computing device 102 having one or more processors 104 (e.g., CPUs), one or more computer-readable media 106, an operating system 108, and one or more applications 110 that reside on the computer-readable media and which are executable by the processor(s). The one or more processors 104 may retrieve and execute computer-program instructions from applications 110 to provide a wide range of functionality to the computing device 102, including but not limited to gaming, office productivity, email, media management, printing, networking, web-browsing, and so forth. A variety of data and program files related to the applications 110 can also be included, examples of which include games files, office documents, multimedia files, emails, data files, web pages, user profile and/or preference data, and so forth.

The computing device 102 can be embodied as any suitable computing system and/or device such as, by way of example and not limitation, a gaming system, a desktop computer, a portable computer, a tablet or slate computer, a handheld computer such as a personal digital assistant (PDA), a cell phone, a set-top box, and the like. For example, as shown in FIG. 1 the computing device 102 can be implemented as a television client device 112, a computer 114, and/or a gaming system 116 that is connected to a display device 118 to display media content. Alternatively, the computing device may be any type of portable computer, mobile phone, or portable device 120 that includes an integrated display 122. Any of the computing devices can be implemented with various components, such as one or more processors and memory devices, as well as with any combination of differing components. One example of a computing system that can represent various systems and/or devices including the computing device 102 is shown and described below in FIG. 4.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 4.

The computing device 102 also includes a graphics processing unit (GPU) 124 separate from the processor(s) 104 that operates to perform various processing related to graphics output by the computing device for display on the display device 118 or integrated display 124. The GPU 124 is a hardware component of the computing device that is dedicated to graphics processing. Functionality provided by the GPU 124 may include controlling aspects of resolution, pixel shading operations, color depth, texture mapping, 3D rendering, and other tasks associated with rendering user interfaces and images for applications. This can include processing tasks such as polygon drawing, bitmap transfers and painting, window resizing and repositioning, line drawing, font scaling, and so forth. The GPU 124 may be capable of handling these processing tasks in hardware at greater speeds than software that is executed on the processor(s) 104. Thus, the dedicated graphics processing capability of the GPU 124 can accelerate graphics processing, reduce the workload of the processor(s) 104, and free up system resources for other tasks. The GPU 124 and processor(s) 104 (e.g., CPUs) may perform separate sequential processing of commands on different respective timelines for rendering of frames, graphics, and/or other processing tasks.

The computing device 102 also includes a throttling module 126 that resides on the computer-readable media and which is executable by the processor(s). The throttling module 126 represents functionality to perform various techniques for GPU self throttling described above and below. The throttling module 126 may be implemented as a component of an application 110 used to control aspects of graphics processing. For instance, the throttling module 126 may be provided as part of a game application for a gaming system to facilitate rendering of frames for the game via the GPU 124 in accordance with techniques described herein. The throttling module 126 may also be implemented as a standalone component as depicted in FIG. 1. In at least some embodiments, the throttling module 126 and a corresponding application 110 may be executed using different respective processes.

In some instances, unpredictable system processing or other unpredictable work may arise in the course of rendering frames. Such unpredictable work may interfere with GPU processing and increase the burden on the GPU. In such instances, the burden on the GPU may be reduced by skipping some of the work that is considered optional or non-critical to a frame. Because the work that creates these instances is unpredictable, timing information for frame processing is employed to determine how long frame processing is taking When frame processing takes longer than expected and/or exceeds a designated timing threshold, this indicates that some unpredictable work has occurred and corrective action(s) may be taken to reduce the burden on the GPU, balance the workload, and avoid frame rate drops.

In one or more embodiments, the GPU 124 may be operated under the influence of the throttling module 126 to control the work performed by the GPU 124. In general, GPU self throttling involves gathering timing information from any suitable source and using the timing information for frames to determine whether or not to throttle processing for the frames performed by the GPU 124. In accordance with techniques described herein, the timing information is obtained from the GPU timeline rather than the CPU timeline. The timelines herein refer to the sequences of commands being executed separately by the GPU and CPU. Because, the CPU timeline may run ahead of the GPU for frame processing, the CPU may not be in a position to make decisions for processing occurring for a prior frame on the GPU. The GPU self throttling approach ensures that sufficient time is available to take corrective actions based on the timing information to fix-up the frames when appropriate. In other words, a decision regarding whether to drop or "throttle" some of the GPU work can be made "just-in time" so that an on-demand choice to conduct heavy or light processing may be made as late as possible in the timeline of the GPU.

In one particular approach, built-in timing registers associated with the GPU 124 are used to gather the timing information. One way this may occur is by setting callbacks that run on the CPU when a certain, variable portion of the GPU frame is hit. Although the callbacks are set to execute on the CPU, the timing for the callbacks is controlled by the GPU timeline. The callbacks may be implemented to obtain values for the current time at different points in the GPU timeline that can be used to compute an elapsed time for the unpredictable/system work. In one approach, the callbacks may be inserted or otherwise included as commands in the sequence of commands executed by the GPU 124.

For instance, the throttling module 126 may be configured to insert callbacks both before and after the variable parts of frames. The variable parts of the frames refer to parts of the frames that may include system work and/or other work that can occur at unpredictable times and vary in amount of time/processing to perform the work. Effectively, the timing information gathered through the callbacks (or otherwise) is used to make a determination regarding whether to perform full/heavy processing or throttle the work to perform partial/light processing. When throttling is triggered based on an elapsed time for unpredictable work, the workload on the GPU may be reduced by skipping portions of a frame designated as optional/non-critical because these parts may be skipped without substantially degrading the quality and/or appearance of the frame. This approach may be used to identify and measure timing for unpredictable work that may adversely affect the GPU timeline. Then, corrective action(s) may be taken to skip optional work so that the frame rendering timeline/frame rate can be maintained.

Various different portions and/or types of processing for a frame may be selected and designated as optional/non-critical by an application developer. Portions and/or processing that are designated as optional/non-critical may be selectively skipped in accordance with GPU self throttling techniques described above and below. By way of example, portions and/or processing that may be designated as optional include but are not limited to, select batched commands in an asynchronous command buffer, background and other non-critical elements, and/or designated special effects such as bloom rendering, shadows, and shading.

When the callback is executed, the CPU is interrupted, briefly, and the callback code is effectively run as part of the GPU timeline. During the first callback, timing registers are read and values of the registers are recorded. During the second callback, the registers are read again and a determination may be made regarding whether or not the frame is running long. Parts of the frame may be fixed-up depending on the results. For instance, the optional parts of the frame can be modified by "fixing up" nested command buffer calls that the GPU will consume later in the frame. When the frame is running long, some command buffer commands/calls may be set to null to skip over the work. In another approach, different command buffers for the same frame work may be provided that involve different amounts of processing (e.g., different workloads). Thus, one command buffer may be associated with heavy processing for use in "normal" conditions and another command buffer may be associated with light or no processing for use in "throttling" conditions. In this case, the throttling module 126 may be configured to select an appropriate one of the command buffers for GPU processing based upon timing information that is gathered in the manner previously described.

Having described an example operating environment, consider now example techniques for GPU Self Throttling in accordance with one or more embodiments.

GPU Self Throttling Techniques

Figure 2:
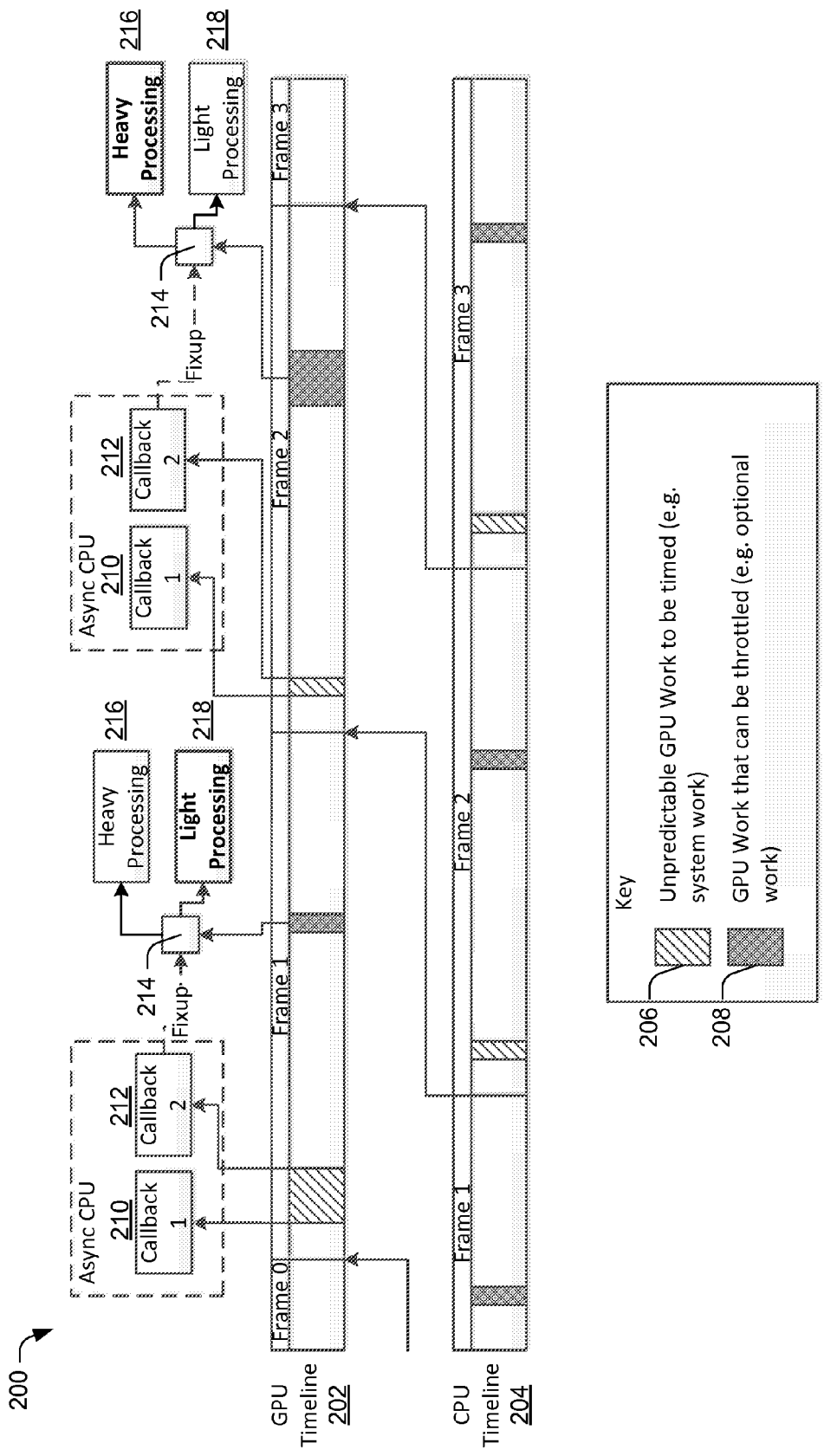
FIG. 2 is an example timeline diagram for GPU self throttling in accordance with one or more embodiments.

FIG. 2 depicts an example timeline diagram 200 in accordance with one or more embodiments. The diagram shows a GPU 202 timeline and a CPU timeline 204. As illustrated, various callbacks are included in the GPU timeline 202 for different frames. Hatched portions 206 represent unpredictable work (e.g., system work) for which timing information is to be obtained. The shaded portions 208 represent work of the GPU that can be throttled (e.g., optional/non-critical work).

For each frame, a first callback 210 is inserted at the end of a preceding frame or otherwise before variable parts of a particular frame. A second callback 212 is inserted after the variable parts of the particular frame, which in some cases may correspond to the start of "normal" processing for the particular frame. The first callback calls into the CPU, gets the current timestamp at the end of one frame and/or before the variable frame part, and records the value. The second callback also calls back into the CPU, gets the current timestamp after the variable frame part and/or at the start of GPU processing tasks for the particular frame. The timestamps may be obtained from built-in timing registers associated with the GPU. The second callback may also compare the values of the first timestamp and second timestamps to ascertain the amount of time that has elapsed. An assessment may be made based on the elapsed time as to whether unpredictable/system work was inserted to the GPU workload, how much time the work or variable part takes to complete, and/or whether or not to "fix-up" a frame by skipping some optional portions of the frame based on the elapsed time. This may occur by comparing the elapsed time to a configurable timing threshold used to control throttling. The elapsed time computed for variable parts of a particular frame will be greater if unpredictable/system work is inserted after a preceding frame and shorter under "normal" conditions. If the timing threshold is exceeded, then throttling may be triggered. It should be noted that the callbacks may occur without interrupting or substantially affecting the work performed by the CPU to build up commands for subsequent frames. In other words, the callbacks may be executed asynchronously outside of the CPU timeline 204 for frame processing as is represented in FIG. 2. In a multi-processor environment this may be accomplished by executing the CPU timeline 204 and callbacks using different respective processors.

Now, for each frame the elapsed time is used to drive a determination 214 regarding whether to perform heavy processing 216 or light processing 218 for optional portions of the frame for which processing by the GPU 124 can be throttled. For example, light processing 218 is selected for frame one in FIG. 2 because the elapsed time is relatively large (as represented by the relatively large hatched portion 206 associated with frame one) and exceeds the configurable timing threshold. Heavy processing 216 is selected for frame two because the elapsed time is relatively small (as represented by the small hatched portion 206 associated with frame two) and less than the configurable timing threshold.

To further illustrate consider the following discussion of example flow diagrams that describe techniques for GPU self throttling that can be implemented in accordance with one or more embodiments. The example procedure(s) depicted can be implemented in connection with any suitable hardware, software, firmware, or combination thereof In at least some embodiments, the methods can be implemented by way of a suitability configured computing device, such as the example computing device 102 of FIG. 1 that includes or otherwise makes use of a throttling module 126.

Figure 3:
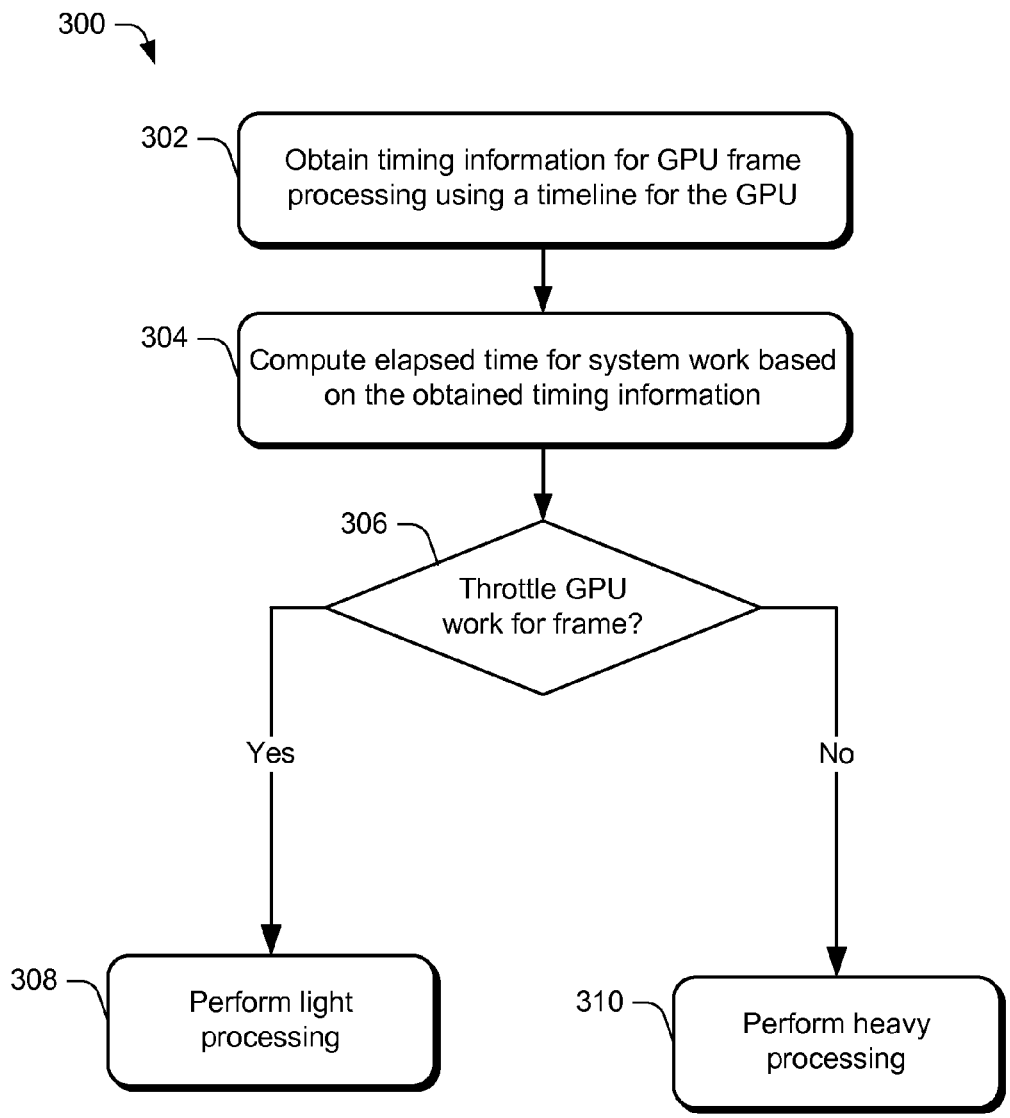
FIG. 3 is a flow diagram that describes details of an example procedure for GPU self throttling in accordance with one or more embodiments.

In particular, FIG. 3 depicts an example procedure 300 in which timing information is used to make a GPU self throttling decision. Timing information for GPU frame processing is obtained using a timeline for the GPU (block 302). This can occur in any suitable way using an appropriate timing source. In one approach, the throttling module 126 may use built-in registers associated with the GPU 124 to obtain the timing information. The timing information may relate to system work or other variable frame parts/unpredictable work that is inserted into the GPU timeline and may be difficult to predict. By way of example and not limitation, one technique to obtain the timing information involves inserting callbacks before and after frames and/or certain variable portions of frames as previously described. The callbacks may be provided as commands of the GPU timeline that call back into the CPU to get appropriate timing information for the GPU processing. Other suitable techniques to obtain timing information can also be employed.

An elapsed time for system work is computed based on the obtained timing information (block 304) and then a determination is made based on the elapsed time regarding whether to throttle GPU work for a frame (block 306). In general, the elapsed time measures how long it takes for system work and/or other unpredictable work that generally occurs between the end of one frame and the beginning of processing for the next frame. As mentioned, the determination of whether to throttle work for a particular frame may be made based on a configurable timing threshold that is compared to the elapsed time. If the elapsed time exceeds the threshold, a decision may be made to throttle the work for the particular frame. If the elapsed time is less than the threshold (e.g., satisfies the threshold), normal work/processing for the particular frame is performed.

Thus, when a decision to throttle is made in block 306, light processing or no processing may be performed (block 308). In this case, one or more non-critical portions of a frame may be skipped and/or alterative light processing steps or command buffers may be selected for GPU processing of a corresponding frame. This may occur by disabling at least some commands in the GPU timeline (e.g., sequence of commands) that correspond to optional work of the particular frame. Commands may be disabled/enabled on an individual basis. For example, commands may be selectively disabled by setting one or more commands and/or an entire command buffer of batched commands to null.

In addition or alternatively, multiple command buffers may also be established for the same work to enable selection between different corresponding levels of processing based upon the elapsed time that is determined in step 304. Accordingly, throttling the work may be accomplished by selecting of a particular command buffer that is associated with relatively light processing from among multiple command buffers. Here the processing may be considered light in comparison with heavy or "normal" processing that is associated with default commands and/or a default command buffer for performing the work. In this manner, a frame may be "fixed-up" by partially or completely skipping one or more portions of the frame designated as optional when throttling is dictated for the frame.

On the other hand, when throttling is not dictated by the decision in block 306, heavy or "normal" processing is performed (block 310). Here, the frame may be processed using normal or default steps/command buffers without throttling. This may involve selecting a default command buffer from among multiple available command buffers. In this manner, timing information for system work gathered using a GPU timeline may be used to drive decisions regarding whether to throttle work performed by the GPU to render a frame.

Aspects of techniques for GPU self throttling described herein, including the example procedure 300, may be implemented by way of one or more application programming interfaces (APIs). The APIs may be provided for a computing device 102 by an operating system 108 or otherwise. The throttling module 126 may be configured to make calls to the APIs to invoke corresponding functionality for GPU self throttling that is provided through the APIs. Generally speaking, suitable code/commands for execution in the GPU timeline may be provided by the throttling module 126 to make calls to the APIs at appropriate times.

For example, the one or more APIs may include a callback API that can be invoked to insert callbacks in the GPU timeline before and after frames to initiate calls to get timestamps as described previously. The callbacks that are inserted through the callback API may operate by calling a time retrieval API configured to facilitate retrieval of the timing information from the CPU. Further, a command buffer control API may be invoked to enable/disable various commands and/or entire command buffers in accordance with throttling decisions for frame processing as described in the preceding discussion.

Having considered example techniques for GPU self throttling, consider a discussion of an example system in accordance with one or more embodiments.

Example System

Figure 4:
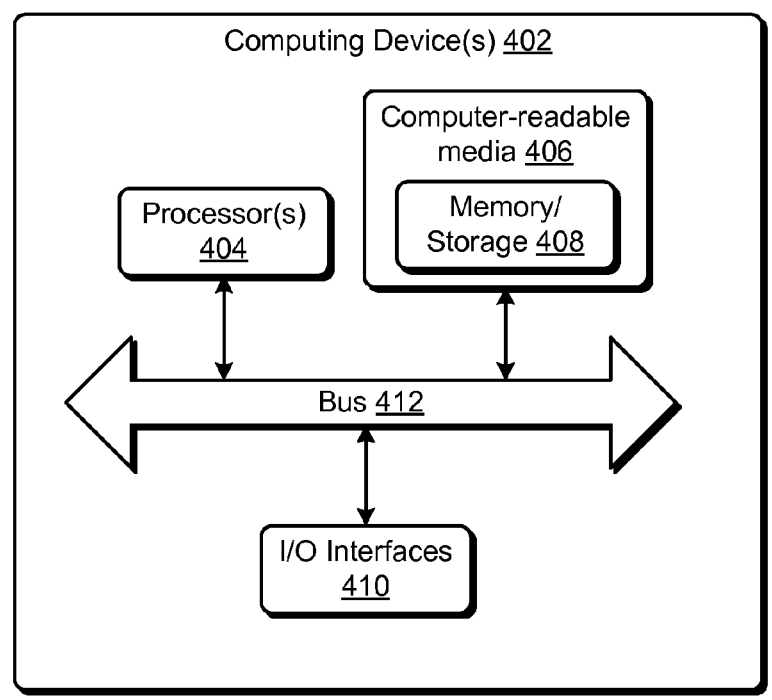
FIG. 4 is a block diagram of a system that can implement the various embodiments.

FIG. 4 illustrates an example system generally at 400 that includes an example computing device 402 that is representative of one or more such computing systems and/or devices that may implement the various embodiments described above. The computing device 402 may be, for example, a server of a service provider, a device associated with a computing device 102 (e.g., a client device), a system on-chip, and/or any other suitable computing device or computing system.

The example computing device 402 includes one or more processors 404 or processing units, one or more computer-readable media 406 which may include one or more memory and/or storage components 408, one or more input/output (I/O) interfaces 410 for input/output (I/O) devices, and a bus 412 that allows the various components and devices to communicate one to another. Computer-readable media 406 and/or one or more I/O devices may be included as part of, or alternatively may be coupled to, the computing device 402. The bus 412 represents one or more of several types of bus structures, including a memory bus or memory controller, a peripheral bus, an accelerated graphics port, and a processor or local bus using any of a variety of bus architectures. The bus 412 may include wired and/or wireless buses.

The one or more processors 404 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. The memory/storage component 408 represents memory/storage capacity associated with one or more computer-readable media. The memory/storage component 408 may include volatile media (such as random access memory (RAM)) and/or nonvolatile media (such as read only memory (ROM), Flash memory, optical disks, magnetic disks, and so forth). The memory/storage component 408 may include fixed media (e.g., RAM, ROM, a fixed hard drive, etc.) as well as removable media (e.g., a Flash memory drive, a removable hard drive, an optical disk, and so forth).

Input/output interface(s) 410 allow a user to enter commands and information to computing device 402, and also allow information to be presented to the user and/or other components or devices using various input/output devices. Examples of input devices include a keyboard, a touchscreen display, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software, hardware (fixed logic circuitry), or program modules. Generally, such modules include routines, programs, objects, elements, components, data structures, and so forth that perform particular tasks or implement particular abstract data types. An implementation of these modules and techniques may be stored on or transmitted across some form of computer-readable media. The computer-readable media may include a variety of available medium or media that may be accessed by a computing device. By way of example, and not limitation, computer-readable media may include "computer-readable storage media" and "communication media."

"Computer-readable storage media" may refer to media and/or devices that enable persistent and/or non-transitory storage of information in contrast to mere signal transmission, carrier waves, or signals per se. Thus, computer-readable storage media excludes signals per se. Computer-readable storage media also includes hardware elements having instructions, modules, and/or fixed device logic implemented in a hardware form that may be employed in some embodiments to implement aspects of the described techniques.

The computer-readable storage media includes volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, hardware elements (e.g., fixed logic) of an integrated circuit or chip, or other storage device, tangible media, or article of manufacture suitable to store the desired information and which may be accessed by a computer.

"Communication media" may refer to a signal bearing medium that is configured to transmit instructions to the hardware of the computing device, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

Combinations of any of the above are also included within the scope of computer-readable media. Accordingly, software, hardware, or program modules, including the throttling module 126, operating system 108, applications 110 and other program modules, may be implemented as one or more instructions and/or logic embodied on some form of computer-readable media.

Accordingly, particular modules, functionality, components, and techniques described herein may be implemented in software, hardware, firmware and/or combinations thereof The computing device 402 may be configured to implement particular instructions and/or functions corresponding to the software and/or hardware modules implemented on computer-readable media. The instructions and/or functions may be executable/operable by one or more articles of manufacture (for example, one or more computing devices 402 and/or processors 404) to implement techniques for GPU self throttling, as well as other techniques. Such techniques include, but are not limited to, the example procedures described herein. Thus, computer-readable media may be configured to store or otherwise provide instructions that, when executed by one or more devices described herein, cause various techniques for GPU self throttling.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims

What is claimed is:

1. A computer-implemented method comprising:
    processing a frame by a graphics processing unit (GPU) of a computing device; and
    during the processing for the frame:
        obtaining timing information for the processing of the frame using a timeline for the GPU;
        computing an elapsed time for unpredictable work inserted into the processing performed by the GPU for the frame based on the obtained timing information;
        determining according to the elapsed time computed for the unpredictable work whether to throttle work performed by the GPU later in processing of the frame by reducing the work for one or more designated portions of the frame that can be throttled; and
        selectively performing light processing or heavy processing for the one or more designated portions later in the frame based on the determination.

2. The computer-implemented method of claim 1, wherein obtaining the timing information comprises inserting callbacks into the timeline for the GPU including a first callback before a variable part of the frame in which the unpredictable work occurs and a second callback after the variable part of the frame, the callbacks executable by the GPU to retrieve the timing information for the unpredictable work.

3. The computer-implemented method of claim 2, wherein computing the elapsed time comprises comparing a first timestamp obtained by the first callback to a second timestamp obtained by the second callback.

4. The computer-implemented method of claim 1, wherein determining whether to throttle the work performed by the GPU comprises comparing the elapsed time to a configurable threshold established to control whether light processing or heavy processing is performed for the frame.

5. The computer-implemented method of claim 1, wherein selectively performing light processing or heavy processing comprises performing light processing to throttle the work by skipping one or more commands in the timeline for the GPU when the elapsed time exceeds a configurable timing threshold.

6. The computer-implemented method of claim 1, wherein selectively performing light processing or heavy processing comprises selecting between multiple different command buffers for the work that are associated with different amounts of processing.

7. The computer-implemented method of claim 1, further comprising making calls to one or more application programming interfaces (APIs) of the computing device that are operable to insert callbacks into the timeline of the GPU, return the timing information responsive to calls from the inserted callbacks, and selectively enable and disable commands to perform the light or heavy processing as directed based on the determination of whether to throttle the work.

8. The computer-implemented method of claim 1, wherein the timing information is obtained using built-in timing registers associated with the GPU.

9. One or more computer-readable storage media storing instructions that when executed by a computing device cause the computing device to implement a throttling module operable to perform acts comprising:
    computing an elapsed time for system work inserted into a timeline for a graphics processing unit (GPU) of the computing device based on timestamps obtained from callbacks included in the timeline for the GPU to measure the elapsed time between an end of processing for one frame and a beginning of processing for a particular frame;
    comparing the elapsed time to a timing threshold established to control when to throttle work performed by the GPU to render frames;
    based on the comparing, making an on-demand determination during processing for the particular frame regarding whether to throttle work for the particular frame including:
        throttling the work for the particular frame when the elapsed time exceeds the timing threshold; and
        performing processing for the particular frame without throttling when the elapsed time is less than the timing threshold.

10. One or more computer-readable storage media of claim 9, wherein the throttling module is further operable to perform acts comprising invoking an application programming interface (API) of the computing device configured to cause insertion of the callbacks into the timeline for the GPU.

11. One or more computer-readable storage media of claim 9, wherein the callbacks are executed by a central processing unit (CPU) of the computing device that is separate from the GPU.

12. One or more computer-readable storage media of claim 9, wherein the throttling comprises skipping work for one or more portions of the particular frame designated as optional portions to reduce a workload of the GPU for the particular frame.

13. One or more computer-readable storage media of claim 9, wherein the throttling comprises setting one or more commands for processing of the particular frame to null to skip at least some work associated with the particular frame.

14. One or more computer-readable storage media of claim 9, further comprising invoking an application programming interface (API) of the computing device configured to cause the throttling by selectively disabling at least some commands associated with processing for the particular frame.

15. One or more computer-readable storage media of claim 9, wherein:
- the throttling module is implemented as a component of an application for the computing device; and
- the application and throttling module are executed using different respective processes of the computing device.

16. A system comprising
- a central processing unit (CPU);
- a graphic processing unit (GPU) separate from the CPU; and
- one or more computer-readable media storing instructions that, when executed by the GPU, implement a throttling module to perform self throttling for the graphics processing unit (GPU) by selectively skipping optional portions of processing for a particular frame rendered by the GPU based on an elapsed time for unpredictable work that is computed during the processing of the particular frame using timing information obtained for a timeline of the GPU.

17. The system of claim 16, wherein selectively skipping the optional portions comprises:
- throttling work for the particular frame when the computed elapsed time exceeds a timing threshold by disabling at least some commands for processing the particular frame to skip the optional portions; and
- performing processing for the particular frame without throttling when the computed elapsed time is less than the timing threshold.

18. The system of claim 16, wherein the throttling module is configured to invoke one or more application programming interfaces (APIs) of the system to perform the self throttling for the particular frame including calling the one or more APIs to:
- insert callbacks in the timeline for the GPU;
- cause execution of the callbacks to obtain the timing information from the CPU using timing registers associated with the GPU;
- enable and disable commands for processing of the optional portions of the particular frame based on the elapsed time.

19. The system of claim 16, wherein the system comprises a gaming system and the throttling module is implemented as a component of a gaming application for the gaming system.

20. The system of claim 16, wherein the unpredictable work is inserted into the timeline for the GPU through system processing performed by the CPU on a timeline for the CPU.

* * * * *